(12) United States Patent
Neou et al.

(10) Patent No.: US 9,185,127 B2
(45) Date of Patent: Nov. 10, 2015

(54) NETWORK PROTECTION SERVICE

(75) Inventors: Vivian Neou, Menlo Park, CA (US);
Robert S. Wilbourn, Palo Alto, CA (US); Handong Wu, Marietta, GA (US); Eileen Liu, Saratoga, CA (US); Colleen Shannon, Redwood City, CA (US); Sam Bretheim, Berkeley, CA (US)

(73) Assignee: Nominum, Inc., Redwood City, CA (US)

( * ) Notice: Subject to any disclaimer, the term of this patent is extended or adjusted under 35 U.S.C. 154(b) by 108 days.

(21) Appl. No.: 13/177,504

(22) Filed: Jul. 6, 2011

(65) Prior Publication Data
US 2013/0014253 A1 Jan. 10, 2013

(51) Int. Cl.
*H04L 29/06* (2006.01)
*G06F 21/55* (2013.01)

(52) U.S. Cl.
CPC ....... *H04L 63/1441* (2013.01); *H04L 2463/144* (2013.01)

(58) Field of Classification Search
None
See application file for complete search history.

(56) References Cited

U.S. PATENT DOCUMENTS

| | | | |
|---|---|---|---|
| 6,256,671 B1 * | 7/2001 | Strentzsch et al. | 709/227 |
| 7,095,715 B2 * | 8/2006 | Buckman et al. | 370/230 |
| 7,493,403 B2 * | 2/2009 | Shull et al. | 709/229 |
| 7,633,868 B2 * | 12/2009 | Buckman et al. | 370/231 |
| 7,761,583 B2 * | 7/2010 | Shull et al. | 709/229 |
| 8,079,087 B1 * | 12/2011 | Spies et al. | 726/26 |
| 8,229,930 B2 * | 7/2012 | Cohen et al. | 707/737 |
| 8,341,745 B1 * | 12/2012 | Chau et al. | 726/24 |
| 8,499,077 B2 * | 7/2013 | Niemela et al. | 709/225 |
| 8,631,489 B2 * | 1/2014 | Antonakakis et al. | 726/22 |
| 8,701,190 B1 * | 4/2014 | Chau et al. | 726/23 |
| 2008/0028463 A1 * | 1/2008 | Dagon et al. | 726/22 |
| 2008/0082662 A1 * | 4/2008 | Dandliker et al. | 709/225 |
| 2008/0155694 A1 * | 6/2008 | Kwon et al. | 726/23 |
| 2008/0184357 A1 * | 7/2008 | Drako et al. | 726/11 |
| 2009/0083413 A1 * | 3/2009 | Levow et al. | 709/224 |
| 2009/0254989 A1 * | 10/2009 | Achan et al. | 726/22 |
| 2009/0265786 A1 * | 10/2009 | Xie et al. | 726/24 |
| 2009/0323550 A1 * | 12/2009 | Buckman et al. | 370/252 |
| 2010/0037314 A1 * | 2/2010 | Perdisci et al. | 726/22 |
| 2010/0235915 A1 * | 9/2010 | Memon et al. | 726/23 |
| 2013/0117282 A1 * | 5/2013 | Mugali et al. | 707/748 |
| 2014/0068775 A1 * | 3/2014 | Ward et al. | 726/24 |
| 2014/0215628 A1 * | 7/2014 | Yan | 726/25 |

FOREIGN PATENT DOCUMENTS

GB 2481356 A * 12/2011 ............. H04L 29/06

* cited by examiner

*Primary Examiner* — Christopher Revak
(74) *Attorney, Agent, or Firm* — Carr & Ferrell LLP

(57) ABSTRACT

A network protection method is provided. The network protection method may include receiving a Domain Name System (DNS) request, logging the DNS request, classifying the DNS request based on an analysis of a DNS name associated with the DNS request, taking a security action based on the classification, analyzing network traffic after taking the security action, and providing substantially real-time feedback associated with the network traffic to improve future DNS request classifications. The method may further include receiving a DNS response and logging the DNS response. The analysis of the DNS name may include receiving DNS data related to the DNS name from a plurality of sources, receiving reputation data related to the plurality of sources, scoring each of the plurality of sources based on the reputation data, and aggregating the DNS data related to the DNS name based on the scoring.

20 Claims, 4 Drawing Sheets

NETWORK PROTECTION SERVICE

BACKGROUND

1. Field of the Invention

This application relates generally to data processing and, more specifically, to systems and methods for protecting network services.

2. Description of Related Art

One of the most pressing problems facing both network operators and the entire Internet community today is the proliferation of botnets. A botnet is a collection of infected computers or bots that have been taken over by hackers and are used to perform malicious tasks or functions. A computer may become a bot when it downloads a file (e.g., an email attachment) that has bot software embedded in it. The typical botnet may include a bot server and one or more bot clients. A botnet may include multiple threats. The malicious acts performed by infected computers may include Denial of Service (DoS) attacks, spam, and financial theft. Internet Service Provider (ISP) networks are very attractive to botnet operators because they offer a reliable and robust infrastructure from which to launch malicious bot-related activities.

Botnets consume resources. To improve performance, network operators spend large amounts of money to maintain and upgrade their networks, which only makes them a more attractive target for the bot operators. Thus, network operators are spending more money on bad traffic each time they upgrade their network instead of deploying a robust bot mitigation solution.

SUMMARY OF THE CLAIMED INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A network protection method is provided. The method may include receiving a domain name system (DNS) request, logging the DNS request, classifying the DNS request based on an analysis of a DNS name associated with the DNS request, taking a security action based on the classification, analyzing network traffic after taking the security action, and providing feedback associated with the network traffic to improve future DNS request classifications.

The analysis of the DNS name may include receiving DNS data related to the DNS name from a plurality of sources, receiving reputation data related to the plurality of sources, scoring each of the plurality of sources based on the reputation data, and aggregating the DNS data related to the DNS name based on the scoring. The analysis may be based on associations of the DNS name and prioritized based on the popularity of the DNS name, and may include determining as to whether the DNS request includes data related to another network protocol. The analysis may also use data based upon the IP address in the answer received by the DNS lookup for the DNS name, and the name, IP address, and the reputation of the authoritative servers used to lookup the answer for the DNS name. Other aspects of the DNS answer such as the 'glue' information, the additional information, or the source IP address of the answer may be used as well.

The classification of the network traffic may include attributing various categories to the DNS request. While the categories may be designated with any terms chosen by a user, in various embodiments the categories include malicious, suspicious, unwanted, and harmless. The unwanted category may be used to designate a category indicative of a misconfigured network resource.

The method for network protection may also include periodically updating the plurality of sources of the DNS data. The DNS data may include information related to a domain owner associated with the DNS name and malicious activities.

The security action, which may be one of a plurality of predetermined actions, may include generating a list of domains having an impact on traffic associated with the network, blocking the DNS request, providing a DNS response, providing a mitigated DNS response, and monitoring network traffic after serving a DNS response. The blocking may occur based on a classification of the DNS name associated with the DNS request as malicious or unwanted. The analysis of the network traffic after taking the security action may be further based on information received from an agent residing on an end-user machine. The network may provide the real-time feedback associated with the network traffic.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Network operators may employ a variety of tools to mitigate bots, which may range from domain name system (DNS)-based solutions to more invasive deep packet inspection (DPI) and client-based anti-virus software. The DNS-based approach may have advantages over the other options because a DNS is the first touch point in any Internet transaction. Using a DNS-based approach to mitigate bots may be both lightweight and cost effective since it only deals with relatively small DNS packets as opposed to large volumes of data (as in an Intrusion Prevention Systems/Intrusion Detection System (IPS/IDS) or the DPI approach). Since actual user traffic is never visible with DNS, there are no privacy concerns as there are with other options. Additionally, DNS is not subject to techniques such as "fast flux" which aim to subvert Internet Protocol (IP)-based mitigation solutions.

Network protection systems and methods described herein offer botnet detection and mitigation solutions. An NPS may be built on an intelligent DNS system to optimize a service provider's network and to improve service quality and security. Network operators may deploy the NPS to avoid spending money on bad traffic.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
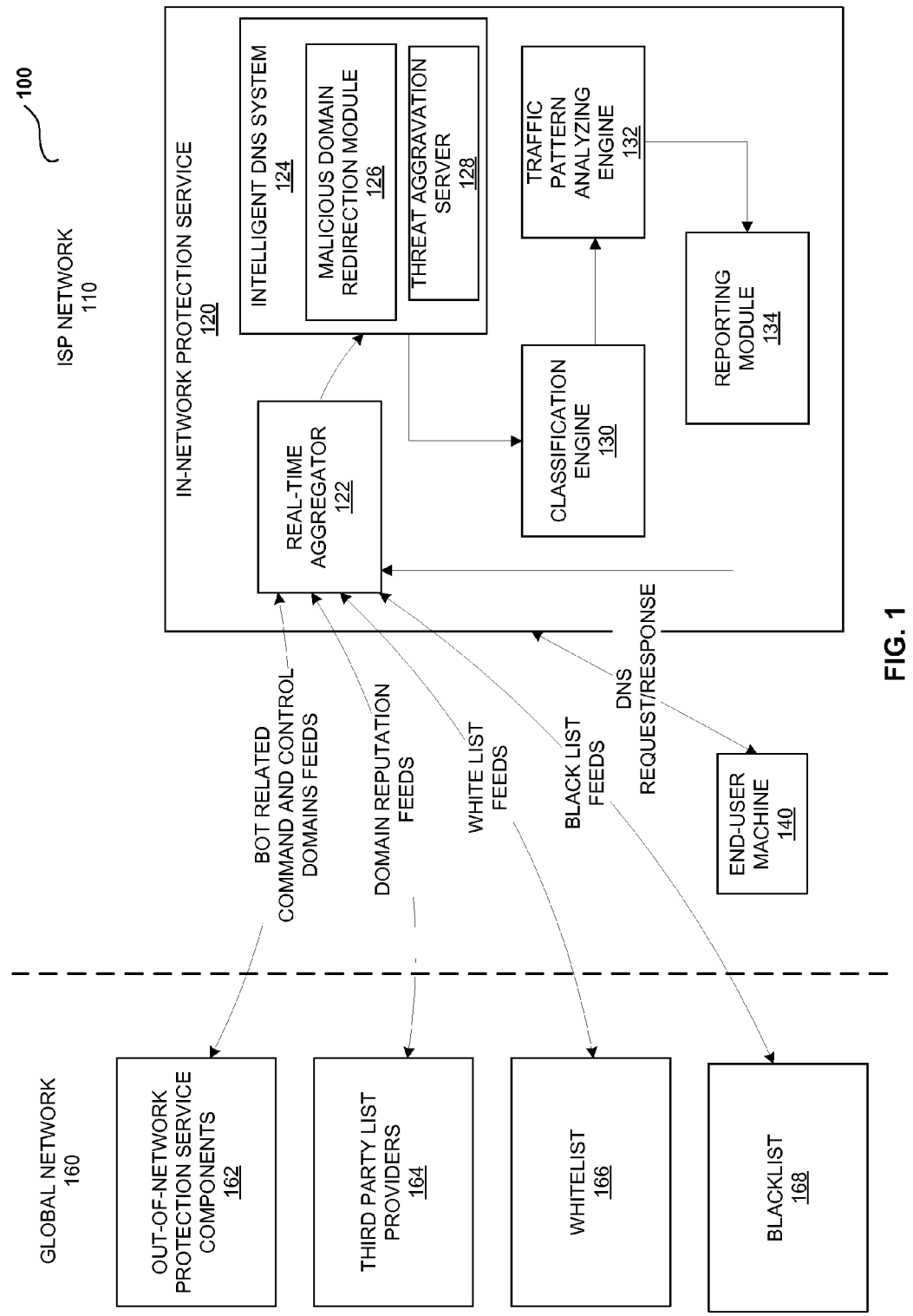
FIG. 1 is a block diagram of various components of a network protection system (NPS) in accordance with various embodiments.

FIG. 1 is a block diagram of various components of embodiments of a network protection system (NPS) 100. The NPS 100 may be utilized as a bot detection and mitigation solution. The NPS 100 may include an in-network protection service 120 (deployed inside the service provider network) and out-of-network protection service components 162 deployed within a global network 160. The in-network protection service 120 may include an intelligent DNS system 124. The intelligent DNS system 124 may include a malicious domain redirection (MDR) module 126 and a threat aggregation server 128.

As mentioned above, the NPS 100 may be built on an intelligent DNS system 124 to optimize an ISP network 110 and to improve service quality and security. The out-of-network protection service components 162 may include a proprietary feed of bot related command and control domains that are pushed to a real-time aggregator 122 within the ISP network 110, and may display bot-related activities as they occur.

The performance of the NPS 100 may depend on the feed or list of validated bot-related command and control domains that is provided to the real-time aggregator 122. Third party list providers 164 may provide domain reputation feeds. However, the third party list providers 164 may have limited access to large amounts of real-time, global DNS query information. In contrast, the intelligent DNS system 124 may include information related to users anywhere in the world.

The in-network protection service 120 may collect, correlate and, analyze received data and implement NPS algorithms. A classification engine 130 may classify the received data. A traffic pattern analyzing engine 132 may receive NPS feeds such as traffic pattern, malware reverse engineering, name server reputation and the like. The traffic pattern analysis refers to the live, real-time collection of DNS usage patterns from various NPS deployments around the globe. This input may allow the NPS 100 to detect bots and mitigate the results of security risks. The results of the traffic pattern analysis may be reported by a reporting module 134.

Performance of the NPS 100 may be based on one or more feeds or lists of validated bot-related command and control domains. The effectiveness of the NPS 100 may be directly related to how quickly, precisely, and proactively the NPS 100 compiles a feed of validated command and control domains and pushes those domains to the ISP network 110 to protect end users and the ISP network 110 itself. Third party list providers 164 may provide domain reputation feeds. However, the third party list providers 164 may have limited access to large amounts of real-time, global DNS query information. The intelligent DNS system 124, on the other hand, may cover hundreds of millions of Internet users. Thus the NPS 100 may offer a near real time, adaptive and globally developed feed of botnet control and command domains.

A variety of techniques and inputs may be used to derive an NPS feed. For example, the inputs may include malware reverse engineering, name server reputation, honeynet activity, third-party lists, criminal network checks, and traffic pattern analysis. The traffic pattern analysis may refer to the live, real-time collection of DNS usage patterns from various NPS deployments around the globe. This input may allow capturing, analyzing, and correlating vast amounts of DNS information. The data may be analyzed to derive a "DNS signature" for known applications such as, for example, Facebook, a Windows software update, a voice over Internet protocol (VoIP) call, and so forth. This approach may allow identifying or cataloging the pattern of DNS requests made by each application on the Internet. Whenever an unknown pattern is discovered, it can be safely deemed to be either a new application or perhaps some anomalous behavior, such as botnet activity. Thus, the NPS 100 may be able to produce a robust feed and hence provide a good bot detection and mitigation solution.

Although ISP networks may vary, the NPS 100 may help to identify some common trends with respect to bot activity on various ISP networks. Bot infected computers, such as an infected end-user machine 140, may generate a disproportionate amount of DNS and network traffic. Mitigating bot activity may decrease the overall load on the computing system. This approach may result in substantial savings on current and future network infrastructure spending.

The ISP network 110 may have a large subscriber population that is infected with a single type of bot. A direct correlation may exist between subscribers making MX (mail exchange record) DNS queries and spam. MX queries may be used for email transactions to map a domain name to a list of message transfer agents for that domain. In general, residential broadband subscribers may not perform MX queries (unless they are sending spam) because they typically do not host an email server. Most MX queries come from infected subscribers.

False positives or accidentally blocking legitimate transactions may be a concern in any reputation-based solution. Just as a credit card company would not want to deny a credit card to a creditworthy person because a credit reputation service accidentally determined that this person had defaulted on a home loan in the past when actually he had not, or a spam mitigation solution would not want to accidentally block legitimate email traffic, so also does NPS systems seek to avoid false positives.

There are a variety of measures that may be taken within the ISP network 110 to limit the possibility of false positives. In a conservative approach, the NPS validation algorithms may be designed to only block domains once there is overwhelming proof that a given domain has no legitimate use whatsoever. This may be achieved by evaluating a given domain from many different perspectives to ensure that the domain is indeed malicious. If there is a possibility that a domain has some legitimate purpose, it will not be blocked but will instead be monitored until the level of certainty approaches a predetermined level.

The NPS service may maintain a whitelist 166 of common domains (e.g., google.com, wsj.com, etc.) accessed around the world and check whether or not a suspect domain is on the whitelist 166. If it is, then the suspect domain may be immediately dropped from consideration.

NPS customers may be encouraged to provide a whitelist of domains that are specific to their network and just as with the whitelist 166, any domain that is on the customer whitelist will not be blocked. The customer whitelist may include domains that are specific to the ISP network 110 such as webmail domains or domains used for Internet protocol television (IPTV) or VoIP transport. This approach may ensure that an internal domain will not be blocked.

There may also be a mechanism to cover the case in which a web site owner believes their web site has been placed on a threat list in error. An open and transparent method may be provided to the owner to request to have their site reviewed if they believe they should be removed from a threat list. This review process may ensure that only those domains representing active threats to Internet users are blocked. No intervention may be required on the part of the network operator for this process.

Bot operators may attempt to circumvent an NPS by modifying or hijacking client DNS settings so that domain resolution does not go through the intelligent DNS system 124 but instead through a DNS resolver that is controlled by the bot operators. If a hacker is successful in doing this, he may effectively control the end-user because he can redirect the end-user to websites of his choosing. For example, if the end-user goes to a bank website (e.g., citibank.com) he can be easily redirected to a fake site and have all of his login information stolen without ever knowing what happened.

To prevent DNS hijacking, a protection mechanism can be added for DNS port 53 in a manner similar to that employed at SMTP port 25 to prevent spam. To this end, DNS resolution may be restricted to a limited set of known good DNS resolvers. This can be achieved, for example, by installing filters or access control lists (ACLs) in the ISP network 110, as is commonly done with SMTP port 25. This approach may prevent DNS hijacking while still preserving end user choice in terms of the DNS resolver they wish to use.

Figure 2:
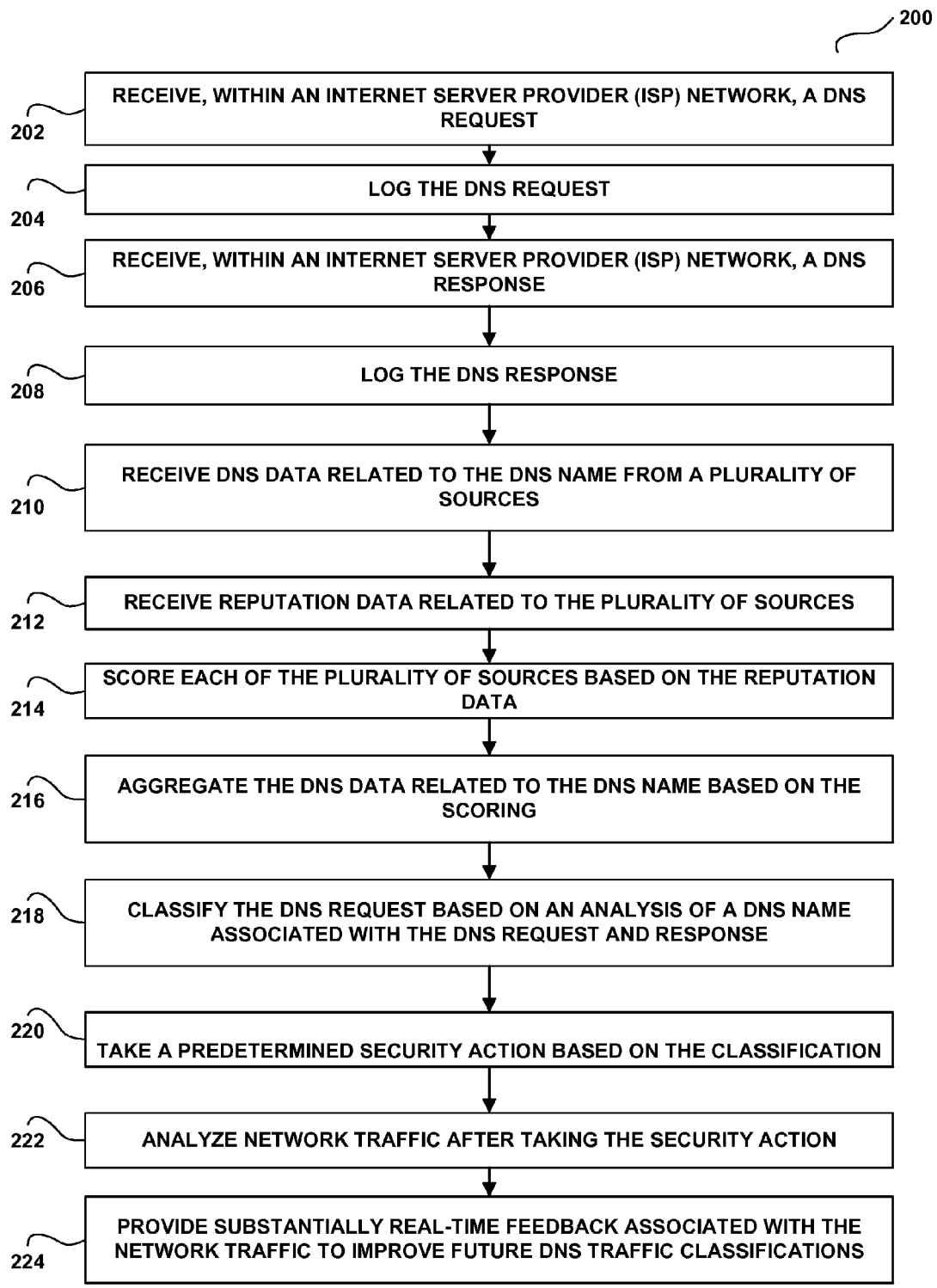
FIG. 2 illustrates a flow chart of a method for protecting a network.

FIG. 2 illustrates a flow chart of a method 200 for protecting a network. The method 200 may be performed by processing logic that may comprise hardware (e.g., dedicated logic, programmable logic, microcode, etc.), software (such as run on a general-purpose computer system or a dedicated machine), or a combination of both. In various exemplary embodiments, the processing logic resides at the in-network protection service 120, as illustrated in FIG. 1.

The method 200 may commence at operation 202 with the real time aggregator 122 receiving, within the ISP network 110, a DNS request from the end-user machine 140, which may be logged at operation 204. The received DNS request can be aggregated with other DNS requests by the real-time aggregator 122 and passed on to the intelligent DNS system 124. The intelligent DNS system 124 may relay the request to a DNS resolver. At operation 206, a DNS response may be received from the DNS resolver, which may be logged at operation 208.

At operation 210, DNS data related to the DNS name associated with the DNS request may be received from a plurality of sources such as, for example, the out-of-network protection service components 162, the third party list providers 164, the whitelist 166, and the blacklist 168. The DNS data may be indicative of the domain name. The DNS data may include a domain owner associated with the DNS name, whether or not the DNS name has been associated with any malicious activity, and whether or not the DNS name has been set up for future malicious activities. Additionally, the DNS data may include the reputation of the IP address associated with the DNS name that can be used in the answer or in the authoritative lookup information as a basis for a security action. The plurality of sources can be periodically updated.

At operation 212, the reputation data related to the plurality of sources can be received. The reputation data may be used to assign a score to the DNS data received from a particular source. For example, if a source is known for providing accurate information, a higher score can be assigned to the DNS data received from the source. Conversely, if the source is known for providing inaccurate DNS data, a lower score can be assigned to the source. Thus, at operation 214, each of the plurality of sources can be scored based on the reputation data received at operation 212.

At operation 216, the real-time aggregator 122 may aggregate the DNS data based on the scoring performed at operation 214. At operation 218, the classification engine 130 may classify the DNS data related to the DNS name based on an analysis of a DNS name associated with the DNS request and response. The aggregation may include averaging results of the scoring. In some embodiments, the analysis may be prioritized based on the popularity of the DNS name. The analysis may also take into an account whether the DNS request includes data related to another network protocol. The classification may include attributing categories to the DNS request such as malicious, suspicious, unwanted, and harmless categories. The unwanted category may be indicative of a misconfigured network resource.

At operation 220, a security action may be taken based on the classification performed at operation 218. The security action, which may be one of a plurality of predetermined actions, may include generating a list of domains having an impact on traffic associated with the network. The security action may also include blocking the DNS request, providing a DNS response, providing a mitigated DNS response, or monitoring network traffic after serving a DNS response. The blocking may occur based on a classification of the DNS name associated with the DNS request as malicious or unwanted.

The classification or determination of whether or not a domain should be blocked could come from first putting in place a security action that monitors the entire network activity, and then using that information to determine a more definitive action (e.g. blocking).

Once the security action is taken, the network traffic can be analyzed at operation 222 and the results of the security action noted. For example, the effect of blocking a domain on overall network traffic can be analyzed by analyzing the network traffic at operation 222.

In some embodiments, the analysis of the network traffic after taking the security action may be further based on information received from an agent residing on an end-user machine.

At operation 224, substantially real-time feedback associated with the network traffic can be provided to the classification engine 130 to improve future traffic classifications. Because the in-network protection service is deployed within the ISP network, a custom feedback loop enables creation of an "ecosystem" having a unique capability for mediation.

Figure 3:
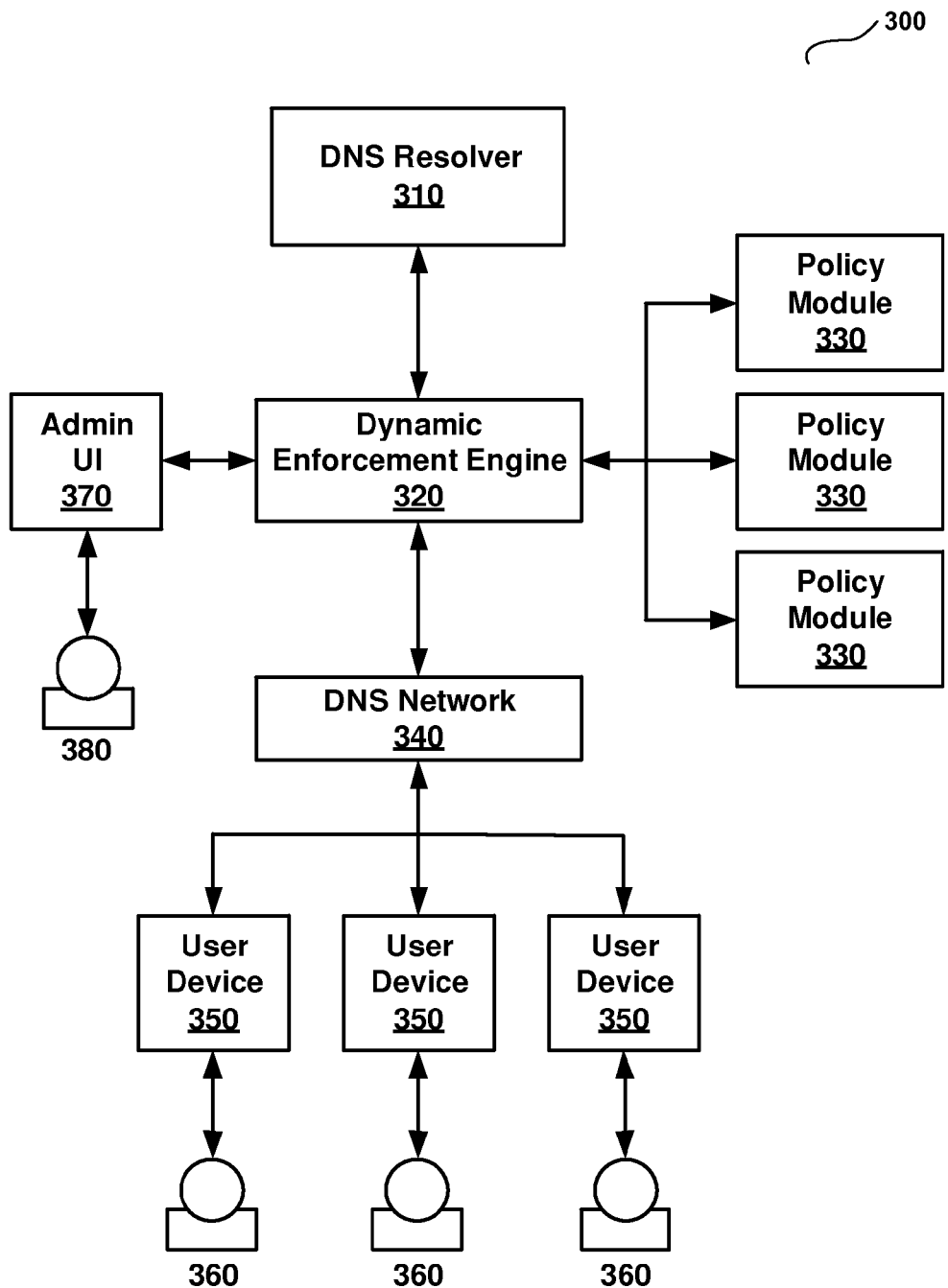
FIG. 3 is a block diagram of a DNS resolver environment.

FIG. 3 illustrates an exemplary Internet service system 300, with a DNS Resolver 310, that may be utilized to support the above described systems and methods. A DNS Resolver 310 operates in conjunction with a dynamic enforcement engine 320. The dynamic enforcement engine 320 may operate in conjunction with one or more policy modules 330 or a network user 380 through an Admin UI 370 to establish any applicable polices at the DNS Resolver 310 level. The content rules are applied to user queries that are received to determine which content is appropriate to be delivered by the DNS network 340 through the various user devices 350 to the network users 360.

The dynamic enforcement engine 320 may generate its policy engine on instructions received from one or more policy modules 330. Each policy module 330 may be constructed to provide various types and levels of services to the DNS network 340. In various embodiments, a policy module 330 may be configured to handle queries directed to subjects including, but not limited to, malicious domain redirection, user access redirection, non-existent domain redirection, and data collection or analysis.

Figure 4:
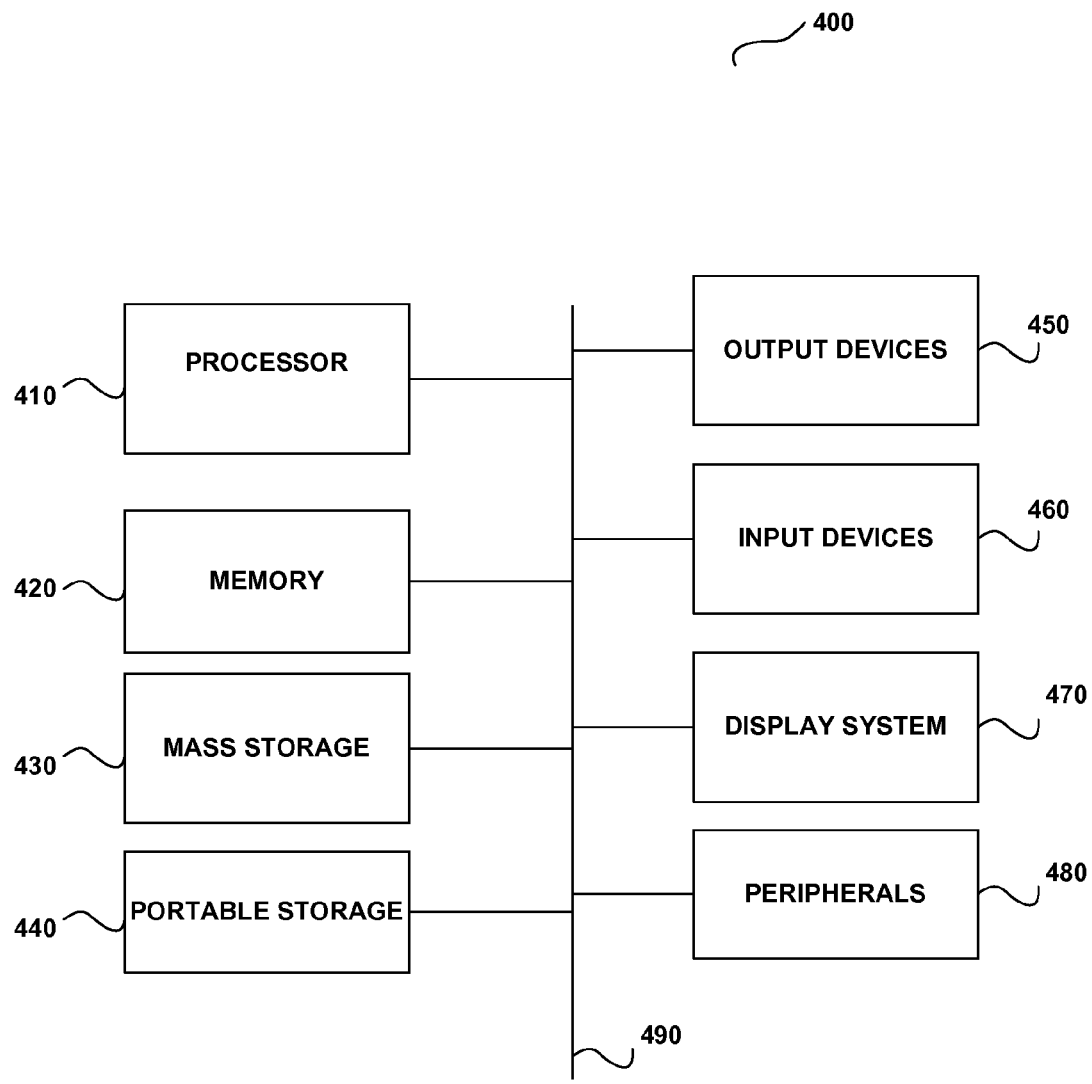
FIG. 4 is a computing system that may be used to implement the methods for suggestive redirection.

FIG. 4 illustrates an exemplary computing system 400 that may be used to implement an embodiment of the present invention. System 400 of FIG. 4 may be implemented in the context of user devices 350, DNS Resolver 310 and the like. The computing system 400 of FIG. 4 includes one or more processors 410 and main memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a display system 470, and other peripheral devices 480.

The components shown in FIG. 4 are depicted as being connected via a single bus 490. The components may be connected through one or more data transport means. Processor 410 and main memory 420 may be connected via a local microprocessor bus, and the mass storage device 430, peripheral device(s) 480, portable storage medium drive 440, and display system 470 may be connected via one or more input/output (I/O) buses.

Mass storage device 430, which may be implemented with a magnetic disk drive or an optical disk drive, is a non-volatile storage device for storing data and instructions for use by processor 410. Mass storage device 430 can store the system software for implementing embodiments of the present invention for purposes of loading that software into main memory 420.

Portable storage medium drive 440 operates in conjunction with a portable non-volatile storage medium, such as a floppy disk, compact disk (CD), or digital video disc (DVD), to input and output data and code to and from the computer system 400 of FIG. 4. The system software for implementing embodiments of the present invention may be stored on such a portable medium and input to the computer system 400 via the portable storage medium drive 440.

Input devices 460 provide a portion of a user interface. Input devices 460 may include an alpha-numeric keypad, such as a keyboard, for inputting alpha-numeric and other information, or a pointing device, such as a mouse, trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information and processes the information for output to the display device.

Peripheral device(s) 480 may include any type of computer support device to add additional functionality to the computer system. Peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a PC, hand held computing device, telephone, mobile computing device, workstation, server, minicomputer, mainframe computer, or any other computing device. The computer can also include different bus configurations, networked platforms, multi-processor platforms, and so forth. Various operating systems can be used, including UNIX, Linux, Windows, Macintosh OS, Palm OS, and other suitable operating systems.

Some of the above-described functions may be composed of instructions that are stored on storage media (e.g., a computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system Random Access Memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. For example, this description describes the technology in the context of an Internet service in conjunction with a DNS resolver. It will be appreciated by those skilled in the art that functionalities and method steps that are performed by a DNS resolver may be performed by an Internet service. One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the invention as described herein. One skilled in the art will further appreciate that the term "Internet content" comprises one or more of web sites, domains, web pages, web addresses, hyperlinks, URLs, any text, pictures, and/or media (such as video, audio, and any combination of audio and video) provided or displayed on a web page, and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

What is claimed is:

1. A network protection method, the method comprising:
   receiving, within an internet service provider network, a Domain Name System (DNS) request in a system including a DNS resolver;
   logging the DNS request;
   classifying the DNS request based on an analysis of a DNS name associated with the DNS request;
   taking a security action based on the classification;
   analyzing network traffic and content after taking the security action; and
   providing a feedback loop based on the analysis of the network traffic to improve future DNS request classifications, in which the feedback loop refers to live, real-time collection of DNS usage patterns from various network protection system (NPS) deployments.

2. The method of claim 1, further comprising:
   receiving the DNS response; and
   logging the DNS response.

3. The method of claim 1, wherein the analysis of the DNS name includes:
   receiving DNS data related to the DNS name from a plurality of sources;
   receiving reputation data related to the plurality of sources;
   scoring each of the plurality of sources based on the reputation data; and
   aggregating the DNS data related to the DNS name based on the scoring.

4. The method of claim 3, wherein the analysis is further based on associations of the DNS name.

5. The method of claim 3, wherein the aggregation includes averaging results of the scoring.

6. The method of claim 3, wherein the analysis is prioritized based on popularity of the DNS name.

7. The method of claim 3, wherein the analysis includes determining whether the DNS request includes data related to another network protocol.

8. The method of claim 3, further comprising periodically updating the plurality of sources.

9. The method of claim 3, wherein the DNS data includes one or more of the following: a domain owner associated with the DNS name, whether or not the DNS name has been associated with a malicious activity, whether or not the DNS name has been set up for future malicious activities, reputation of an Internet Protocol (IP) address associated with the DNS name, and the name, IP address, and the reputation of an authoritative server used to lookup an answer for the DNS name.

10. The method of claim 3, wherein the plurality of sources includes the network providing real-time feedback associated with the network traffic.

11. The method of claim 1, wherein classifying includes attributing one or more categories to the DNS request.

12. The method of claim 11, wherein at least one of the categories is indicative of a misconfigured network resource.

13. The method of claim 11, wherein at least one of the categories is indicative of a botnet.

14. The method of claim 11, wherein at least one of the categories is indicative of an illegal site.

15. The method of claim 1, wherein taking the security action includes generating a list of domains having an impact on traffic associated with the network.

16. The method of claim 1, wherein the security action includes one or more of the following: blocking the DNS request, providing a DNS response, providing a mitigated DNS response, and monitoring network traffic after serving a DNS response.

17. The method of claim 16, wherein the blocking the DNS request occurs based on a classification of the DNS name associated with the DNS request as malicious or unwanted.

18. The method of claim 16, wherein the blocking the DNS request is based on results of a security action that monitors the entire traffic.

19. The method of claim 1, wherein the analysis is further based on information received from an agent residing on an end-user machine.

20. The method of claim 1, wherein the analysis further includes the active gathering of unrecognized domain names.

* * * * *